June 16, 1964
F. M. JOHNSON
3,137,231
CHAFF DISPENSER SYSTEM
Filed June 8, 1956
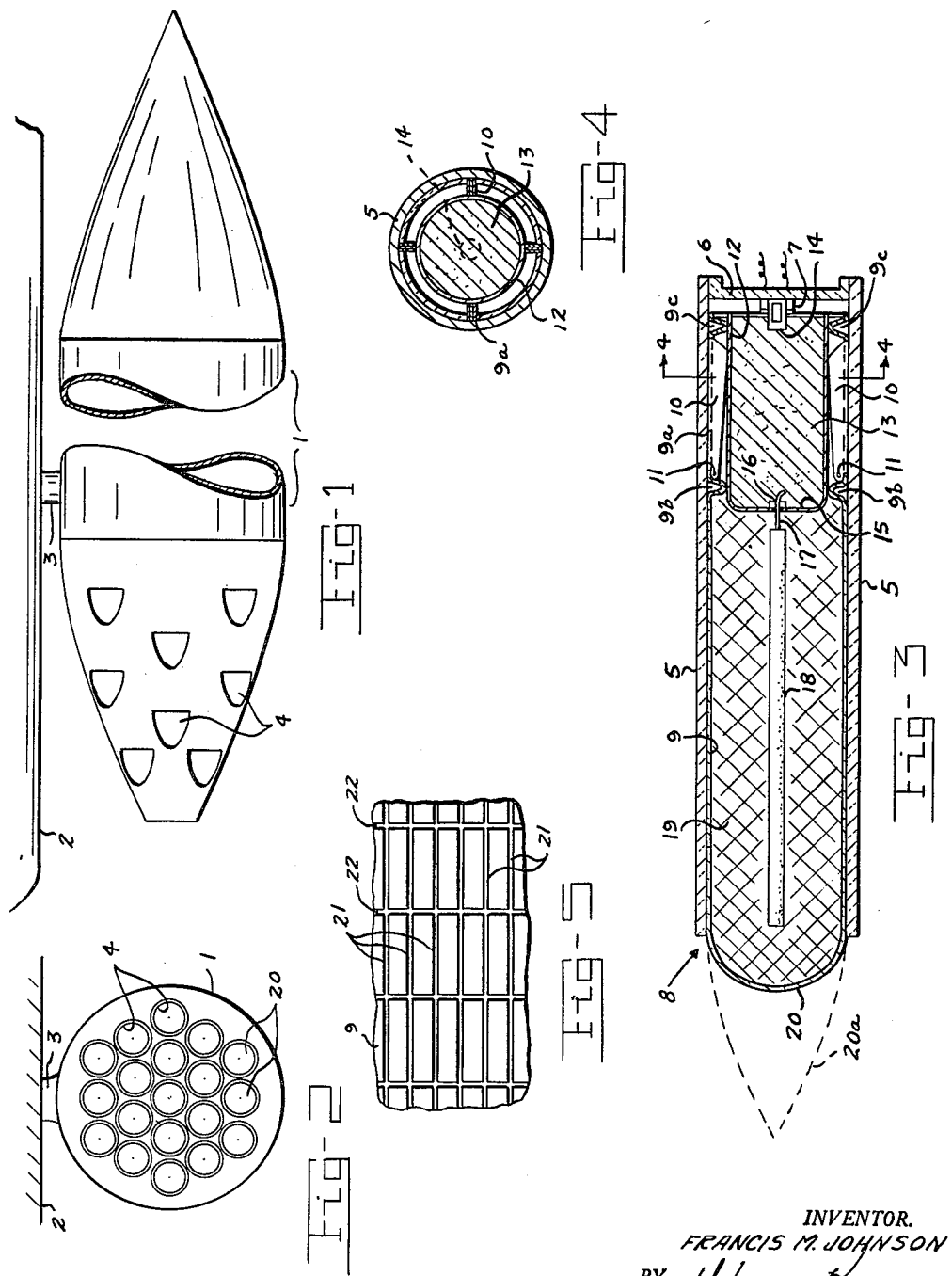
INVENTOR.
FRANCIS M. JOHNSON
BY
ATTORNEYS

United States Patent Office 3,137,231
Patented June 16, 1964

3,137,231
CHAFF DISPENSER SYSTEM
Francis M. Johnson, Dayton, Ohio, assignor to the United States of America as represented by the Secretary of the Air Force
Filed June 8, 1956, Ser. No. 590,332
2 Claims. (Cl. 102—34.4)
(Granted under Title 35, U.S. Code (1952), sec. 266)

The invention described herein may be manufactured and used by or for the United States Government for governmental purposes without payment to me of any royalty thereon.

This invention relates to "chaff" dispensing apparatus, and more particularly, to means and apparatus for dispensing chaff and radar counter-measure reflective matter in front or directly ahead of aircrafts in flight for further confusion of an observer at a receiving radar apparatus to eliminate the possibility of the chaff dispensing aircraft and following aircrafts being separately silhouetted on the receiving radar screen.

More particularly the invention proposes the firing or projection of chaff carrying rockets from aircrafts somewhat similar to conventional rockets, but containing "chaff" material therein with a timed bursting charge in the rocket initiated by the combustion of the rocket propellant charge, whereby the chaff material is scattered over a comparatively large area ahead of the aircraft so that the receiving radar will track the chaff material rather than the aircraft, to further confuse any search radar screen picture for the radar observer.

A further object of the invention is the provision of a chaff dispensing rocket in which the case or body is made of frangible reflective material and serrated or scored in a predetermined pattern, so as to break into small reflective particles of predetermined size when its explosive charge is detonated to form additional chaff-like material.

A further object is the provision of means for dispensing chaff material ahead of the chaff dispensing aircraft so that the aircraft can pass through the dispensed chaff material and prevent the aircraft from being clearly or separately silhouetted on the radar screen.

A further object includes the provision of a wing tank having a plurality of fiber glass rocket tubes or barrels in its front end and discharging forwardly, for receiving the chaff dispersing rockets together with conventional means for igniting the propellant charges in the rear ends of the rockets while they are in the tubes.

Other objects and advantages of the invention will become apparent from the following description and accompanying drawings in which like reference characters refer to like parts in the several figures.

*Drawings*

FIGURE 1 is a somewhat fragmentary diagrammatic side elevation of the forward portion of an aircraft wing tank, showing the chaff rocket discharge openings in the front end of the wing tank.

FIGURE 2 is an end elevation of the tank shown in FIGURE 1, illustrating the relative positions of the chaff rocket dispensing tubes or barrels.

FIGURE 3 is a longitudinal sectional view taken through one of the chaff rocket holding and dispensing tubes and one of the chaff dispensing rockets therein.

FIGURE 4 is a transverse sectional view through the rocket barrel and a rocket therein, taken about on line 4—4 in FIGURE 3.

FIGURE 5 is an enlarged fragmentary view of a portion of the rocket case, shown in elevation, to illustrate the serrated or scored interior surface of the body or casing of the rocket.

Referring more particularly to FIGURE 1 the reference numeral 1 indicates a wing tank which is supported at the outer end of the wing 2 of an aircraft by suitable supports or hangars 3. The wing tank 1 is provided with a plurality of rocket barrels or tubes 4.

The rocket tubes 4 are preferably fiber glass barrels 5 closed at these inner ends 6 and provided with electrical contacts 7, energized when desired from within the aircraft for firing the rockets by igniters at their rear ends for firing the propellant charges.

The fiber glass barrels are suitably fixed in the forward end of the wing tank or tanks 1 and discharge forwardly through the openings 4ª in the sides and end of the nose piece of the tank.

One of the chaff dispensing rockets is indicated at 8 and comprises a shell or case 9 preferably cylindrical, as shown in FIGURES 3 and 4, and slotted at its rear end at 9ª to house the extensible stabilizer fins or guide vanes 10 which are preferably hinged at 11 at their front ends.

The propellant container or charge cup or holder is indicated at 12 and comprises a cup preferably of pyrex or suitable metal and is centrally secured in the rear end of the shell 9 by annular internal ribs or projections 9ᵇ and 9ᶜ.

The cup 12 contains the propellant charge 13 which is adapted to be ignited at its rear face or outer end by an electrical primer or igniter 14 in the center of the outer end of the charge cup 12, and adapted to be energized by the contacts 7 after the rocket is fully inserted in the tube or barrel 4.

The forward closed end 15 of the propellant charge cup 12 is apertured at 16 to receive the inner end of a fuse member 17 for detonating the bursting of chaff dispensing charge which is indicated at 18 and located at the center, or on the axis of the rocket shell 8 and extends longitudinally through the center of the casing 9.

The interior of the shell 9 is suitably packed with radar "chaff" material indicated at 19 and is retained therein by an end closure 20 which may be blunt and rounded, as shown in full lines at 20 in FIGURE 3, or sharp and stream lined as indicated in dotted lines at 20ª in FIGURE 3.

The rocket shell or case is preferably made of hard, heat treated aluminum or may be heat treated glass. It is preferably serrated or scored on its inner, or its outer surface as shown at 21 and 22 to insure fragmentation and maximum dispersal of the chaff contents and the fragments of the shell upon the detonation of the propellant charge 13 reaches and ignites the fuse 17. The fuse may be slow-burning to provide a predetermined time interval before the bursting charge 18 is fired. If the shell of the rocket is aluminized and polished to be sufficiently reflective the fragments induced by the serrations 21 and 22 can be of suitable predetermined size and dimensions to function as additional "chaff" material when the case bursts.

In the operation the rocket tubes or barrels 4 are first loaded by inserting the chaff rockets therein, pushing them back until the contacts at the rear ends of the rockets and those at the inner ends of the barrels are established. These contacts may be of any conventional practical types, such as, for instance, of the type used between the well known "bazooka and bazooka rockets." Suitable conventional safety and detent holding means may also be provided to yieldably retain the rockets in the tubes against accidental displacement.

The rockets are fired when the circuits to the contacts 7 are closed, preferably under the control of the pilot or operator within the aircraft. This can be also accomplished in any well known manner, for instance, by circuit closing contacts operated by an intervalometer, somewhat after the manner of dropping bombs from a bombing aircraft. It may be preferable to launch the rockets successively as the lead aircraft passes over or in advance of passing on an anti-aircraft radar protected territory.

Upon the ignition of each propellant charge the chaff rocket is, of course, projected forwardly in front of the chaff dispensing aircraft. When the propellant charge 13 burns sufficiently to ignite the fuse 17 for the bursting charge the fuse 17, upon its consumption, fires the bursting charge 18, which explodes, the internal pressure scattering the chaff material 19 and the fragments of the case in front of the aircraft.

The distance ahead of the chaff dispensing aircraft where the chaff is dispensed or scattered can be determined by the length and characteristics of the fuse 17 and the amount and characteristics of the propellant charge 13. For instance, if a shorter propellant chamber 12, and/or a smaller propellant powder charge or a faster burning fuse is employed, the bursting charge 18 will be ignited sooner, and therefore closer to the chaff dispensing-aircraft, while if a longer propellant chamber and greater propellant charge is employed, or propellants of a slower burning rate is employed, the rocket will advance farther in front of the chaff dispensing aircraft before the chaff is dispersed into front of the advancing chaff dispensing aircraft and any other associate aircrafts that may be following.

When the bursting charge 18 is fired by the fuse 17 the pressure created within the frangible case on shell 9 will cause the same to burst or split into fragments of predetermined size as controlled by the spacing between the serrations 21 and 22. If the chaff case or shell is made with aluminated finish the fragments, if of the desired size, may form additional counter measure radar chaff material in addition to the chaff material 19 which is or was packed in the case around the elongated bursting charge 18.

The chaff 19 and fragments of the casing 9 are thus dispensed over a comparatively large area, materially in front of the advancing aircraft or aircrafts. The aircrafts pasing through this chaff-laden path provide for further confusion of the observer at the receiving radar and eliminates the possibility of the aircraft being separately silhouetted on the radar receiving screen, the chaff material to make the spotting of individual aircraft impossible, and also makes the use of radar controlled anti-aircraft fire and missiles very inaccurate and ineffective.

When a group of aircraft is proceeding toward a radar protected target the chaff rockets can be discharged in possibly different directions and directed considerably above, or below, the altitude of the approaching aircraft before the supposed attacking group becomes prominent on the radar screen.

The explosion of the rockets near or over the target area will present a more prominent display for the search radar whereby the radar will "lock" onto the chaff-laden areas rather than the approaching aircraft also presenting a display on the screen of a greater attacking force than actually present. Following the discharge of the rockets the aircraft may change these directions or altitudes and attack a different target entirely or approach at a different elevation or range from that displayed on the scope screen as a result of the chaff material dispensed by the chaff rockets.

The invention has been described in terms of a desirable embodiment thereof, but it is to be understood that the invention is not limited by the embodiment shown and described, nor otherwise, than by the appended claims.

I claim:

1. In a chaff dispensing rocket, a hollow frangible casing, a rocket propellant cup in the rear end of said casing facing rearwardly and spaced inwardly from said casing, spacer means between said cups and the casing for centrally supporting the cup in the casing, said cup having a fuse receiving aperture through its forward bottom portion, a rocket propellant charge in said cup for propelling said rocket, a timing fuse extending through said aperture into said propellant charge to be ignited, thereby following a predetermined combustion of said propellant, an elongated bursting charge disposed centrally and longitudinally within said casing in forwardly spaced relation to said propellant cup in communication with said timing fuse to be ignited thereby, radar reflective chaff material packed within said casing surrounding said elongated bursting charge, igniter means disposed in the rear of said propellant cup, for igniting said propellant charge, closure means for the forward end of said casing, and closure means for the rear end of said casing and said propellant cup.

2. A chaff dispensing rocket as claimed in claim 1 in which the surface of the casing is scored in intersecting direction to provide unscored portions of small predetermined radar chaff-like proportions when the casing is caused to burst by said bursting charge, the surface of said casing being aluminized to make said unscored portions highly radar reflective.

References Cited in the file of this patent

UNITED STATES PATENTS

| | | |
|---|---|---|
| 658,231 | Bickel | Sept. 18, 1900 |
| 1,284,149 | Saladiner | Nov. 5, 1918 |
| 2,344,957 | Anzalone | Mar. 28, 1944 |
| 2,411,862 | Arnold | Dec. 3, 1946 |
| 2,463,233 | Alexanderson | Mar. 1, 1949 |
| 2,503,269 | Hickman | Apr. 11, 1950 |
| 2,535,309 | Mari | Dec. 26, 1950 |

FOREIGN PATENTS

| | | |
|---|---|---|
| 579,259 | Great Britain | July 29, 1946 |
| 924,013 | France | Mar. 3, 1947 |